(12) United States Patent
Braithwaite et al.

(10) Patent No.: US 11,033,061 B2
(45) Date of Patent: Jun. 15, 2021

(54) SCRAPER GLOVE

(71) Applicants: Daryl Braithwaite, Fairview, TX (US); Jonathan Kyle Komenda, Liberty, UT (US)

(72) Inventors: Daryl Braithwaite, Fairview, TX (US); Jonathan Kyle Komenda, Liberty, UT (US)

(73) Assignee: D4 DAB, LLC, Fairview, TX (US)

( * ) Notice: Subject to any disclaimer, the term of this patent is extended or adjusted under 35 U.S.C. 154(b) by 0 days.

(21) Appl. No.: 16/176,861

(22) Filed: Oct. 31, 2018

(65) Prior Publication Data

US 2020/0138132 A1 May 7, 2020

Related U.S. Application Data

(60) Provisional application No. 62/579,688, filed on Oct. 31, 2017.

(51) Int. Cl.
| | |
|---|---|
| *A41D 19/01* | (2006.01) |
| *A41D 19/015* | (2006.01) |
| *A41D 19/00* | (2006.01) |
| *A01B 1/06* | (2006.01) |
| *A61H 7/00* | (2006.01) |

(52) U.S. Cl.
CPC .......... *A41D 19/01594* (2013.01); *A01B 1/06* (2013.01); *A41D 19/0024* (2013.01); *A41D 19/0051* (2013.01); *A61H 7/003* (2013.01)

(58) Field of Classification Search
CPC .......... A41D 19/01594; A41D 19/0051; A41D 19/0024; A01B 1/06; A61H 7/003
See application file for complete search history.

(56) References Cited

U.S. PATENT DOCUMENTS

| | | | | |
|---|---|---|---|---|
| 183,375 | A * | 10/1876 | Cutlift | A41D 19/01547 2/161.8 |
| 1,055,838 | A * | 3/1913 | Torrance | A41D 19/01547 2/161.8 |
| 2,409,101 | A * | 10/1946 | Brittingham | A01B 1/00 2/21 |
| 2,725,570 | A * | 12/1955 | Penna | A41D 19/0013 2/163 |
| 2,954,832 | A * | 10/1960 | Pirone | A01G 20/30 172/370 |
| 3,650,172 | A * | 3/1972 | Osborne | G10D 3/163 84/322 |
| 3,927,595 | A * | 12/1975 | Ferguson | A41D 13/087 84/322 |
| 4,149,601 | A * | 4/1979 | Taylor | A41D 19/01594 172/370 |
| 4,748,711 | A * | 6/1988 | Markus | B60S 3/045 15/227 |

(Continued)

*Primary Examiner* — Khaled Annis

(57) ABSTRACT

A scraper glove is provided and includes a glove body including one or more finger sleeves; and one or more scraper elements. Each of the scraper elements includes a receptacle portion positioned within a respective one of the finger sleeves to accept one or more fingers of a user, and a scraping portion with one or more scraping edges extending from a tip of a corresponding finger sleeve and integrally connected to the corresponding receptacle portion, wherein the scraping portion is configured to scrape a plant-based medium.

20 Claims, 10 Drawing Sheets

(56) References Cited

U.S. PATENT DOCUMENTS

| | | | | |
|---|---|---|---|---|
| 4,867,246 A * | 9/1989 | Kiger | A01B 1/00 | 172/370 |
| 5,014,792 A * | 5/1991 | Gierloff | A01G 1/06 | 172/250 |
| 5,323,677 A * | 6/1994 | Knutson | G10D 3/163 | 84/322 |
| 5,644,796 A * | 7/1997 | Laughlin | A41D 19/01594 | 2/160 |
| 5,687,424 A * | 11/1997 | Masley | A41D 19/01547 | 2/163 |
| 5,887,283 A * | 3/1999 | Mackay | A01B 1/00 | 172/370 |
| 6,058,510 A * | 5/2000 | Breitenbach | A41D 19/01594 | 172/371 |
| 6,061,830 A * | 5/2000 | Geller | A41G 7/00 | 2/159 |
| 6,460,190 B1 * | 10/2002 | Blum | A47L 13/12 | 2/158 |
| 6,557,178 B1 * | 5/2003 | Hoover | A41D 19/01594 | 15/227 |
| 7,375,268 B1 * | 5/2008 | Thornhill | G10D 3/163 | 84/315 |
| 8,502,053 B2 * | 8/2013 | Gustafson | G10D 3/163 | 84/322 |
| 8,955,166 B1 * | 2/2015 | Madden, Jr. | A41D 19/01594 | 2/160 |
| D749,792 S * | 2/2016 | Visokey | D29/117.1 | |
| 9,345,278 B2 * | 5/2016 | Crear | B26B 27/007 | |
| D821,697 S * | 7/2018 | Matalon | D2/617 | |
| 2005/0231471 A1 * | 10/2005 | Mallard | A41D 19/0024 | 345/156 |
| 2007/0118968 A1 * | 5/2007 | Doty | A61H 7/003 | 2/160 |
| 2007/0199167 A1 * | 8/2007 | Mason | A47L 13/022 | 15/105 |
| 2012/0317954 A1 * | 12/2012 | Landicini, Jr. | A01D 7/00 | 56/400.01 |
| 2013/0061368 A1 * | 3/2013 | Filippone | A41D 19/0024 | 2/160 |
| 2013/0291281 A1 * | 11/2013 | Lee | A41D 19/0024 | 2/160 |
| 2016/0007663 A1 * | 1/2016 | Price | A41D 19/0024 | 2/160 |
| 2016/0081404 A1 * | 3/2016 | Visokey | A41D 13/087 | 2/161.6 |
| 2016/0100637 A1 * | 4/2016 | Anderson | A41D 19/0024 | 2/161.8 |
| 2017/0055605 A1 * | 3/2017 | Block | A41D 19/0086 | |
| 2017/0352336 A1 * | 12/2017 | Dutton | G10D 3/163 | |
| 2018/0249774 A1 * | 9/2018 | Ohanian | A41D 19/01594 | |

\* cited by examiner

SCRAPER GLOVE

RELATED APPLICATIONS

This application claims benefit to U.S. Provisional Patent Application Ser. No. 62/579,688, filed Oct. 31, 2017, which is incorporated by reference herein in its entirety.

BACKGROUND

This disclosure relates in general to gloves and, more particularly, glove-based tools.

The holiday of Halloween is an important holiday in the United States and is becoming an increasingly popular celebration in many other parts of the world. To commemorate the autumn season, Halloween and other autumn celebrations make use of decorative pumpkins, gourds, and other fall fruit as decorations, activities, and novelties. Among the most popular uses of pumpkins and gourds is the carving of jack-o'-lanterns. Traditionally, jack-o'-lantern carving involves hollowing out the pumpkin by removing the flesh and seeds (collectively referred to herein as "pulp") from the inside of the pumpkin and carving an image into one or more sides of the pumpkin. Comical or scary faces and images are common images. The presentation of the pumpkin may be further enhanced by placing a light source, such as a traditional or electronic candle, into the hollow interior of the pumpkin and cause the image to glow. In recent years, the use of other species of fruits and vegetables have been used to construct jack-o'-lanterns and other arts and crafts, including melons and other examples.

BRIEF DESCRIPTION OF THE DRAWINGS

Like reference numbers and designations in the various drawings indicate like elements.

DETAILED DESCRIPTION

Given the rising popularity of Halloween, jack-o'-lantern carving, and other crafts, which make use of fruit and vegetable as media, an increasing and persistent interest in participating in such crafts exist. For some, one of the least pleasurable aspects of carving a jack-o'-lantern or other such craft is the preparation of the medium for carving of images or building sculptures from the hollowed-out shell of the pumpkins, melons, gourds, or other plant-based medium (referred to herein collectively as "plant-based medium"). For instance, in preparation of a pumpkin for carving as a jack-o'-lantern, users traditionally, cut an opening in the pumpkin and use their hands to empty the pumpkin of its pulp, followed by the use of a spoon or other scraping utensil to scrape away any remaining pulp. Almost inevitably, these preparation steps result in some of the liquid and pulp from within the plant-based medium's cavity to transfer to the skin or clothes of the user, as these scraping actions (with and without utensils) involve the user reaching their hand at least partially into the hollow cavity of the plant-based medium, among other example issues. Some users may be allergic to or find it undesirable to contact pulp and plant juice, discouraging such users from participating in such activities.

Figure 1A:
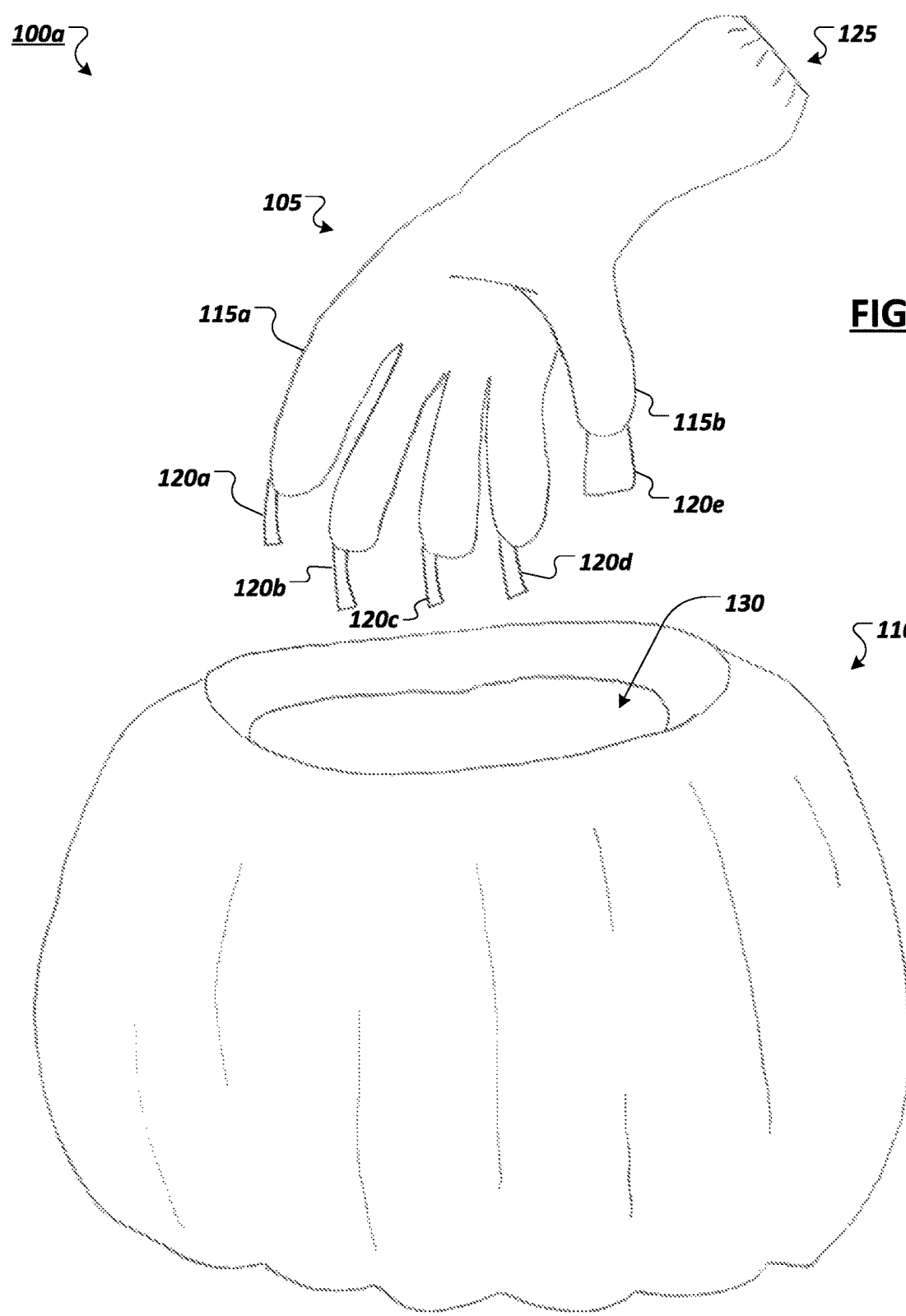
FIGS. 1A-1B are schematic diagrams showing the use of an example scraper glove to remove pulp from a pumpkin.
Figure 1B:
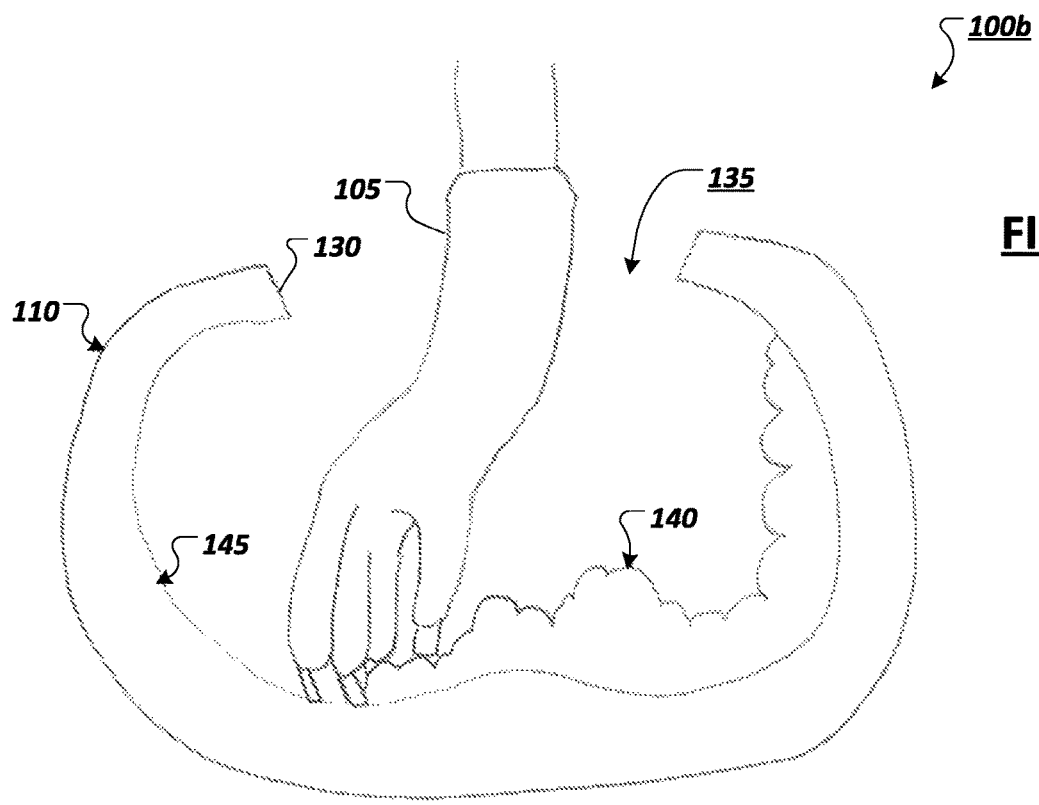

Turning to FIGS. 1A-1B, simplified illustrations 1000*a-b* are presented to illustrate an implementation of a scraper glove 105, which may be used to scrape and hollow-out the interior of a plant-based medium 110, such as a pumpkin, other gourd, melon, etc. Such hollowing-out may be performed in connection with preparing the plant-based medium for use in a craft project, such as the carving of a jack-'o-lantern. For instance, as shown in FIG. 1A, the scraper glove 105 may be provided with one or more finger sleeves (e.g., 115*a-b*) in which the fingers of a user may be inserted. At the ends of one or more of these finger sleeves, rigid scraper elements (e.g., 120*a-e*) may be provided, which may be reinforced within the finger sleeves to effectively extend the fingers and fingernails of the user to allow the user to scrape the interior of the plant-based medium of pulp the user desires to remove. This may allow the user the dexterity enjoyed when emptying the plant-based medium of pulp by hand, while providing the additional example benefits of attaching rigid scrapers to the user's hand and protecting the user's skin and clothing from contact with the plant-based medium's juice and pulp, among other example advantages. In some implementations, the opening 125 of the glove 105 may include an elastic band, a tie, or other closure, which may assist in securing the glove 105 to the user's arm and further protecting against plant-based material from entering the interior of the glove, among other example features and advantages.

Continuing with this example, a user, upon putting on the glove, may insert their now-gloved hand into the interior cavity of plant-based medium 110, for instance, through an opening 130 carved in the plant-based medium 110. As shown in the cross-sectional diagram of the plant-based medium 110 illustrated in FIG. 1B, the user may then perform a scraping and grabbing motion within the cavity 135 to scrape the interior sides of the plant-based medium and collect pulp 140 for removal from the cavity 135 (e.g., through opening 130).

Figure 2A:
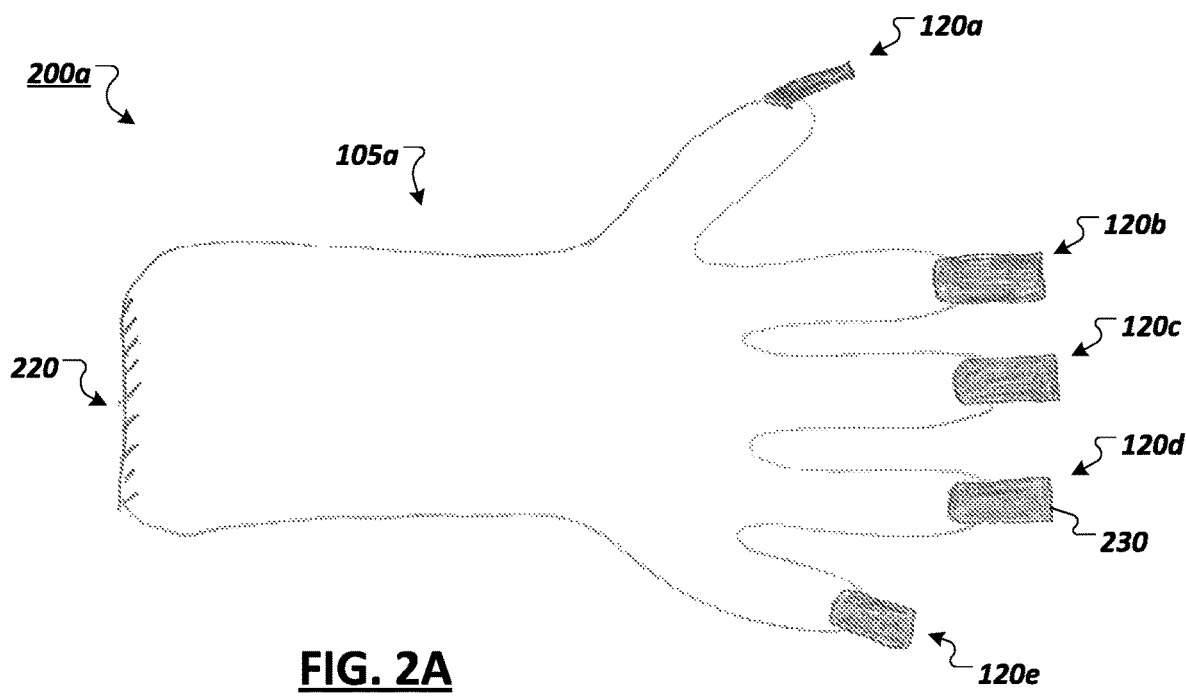
FIGS. 2A-2F are simplified diagrams of example scraper gloves.
Figure 2B:
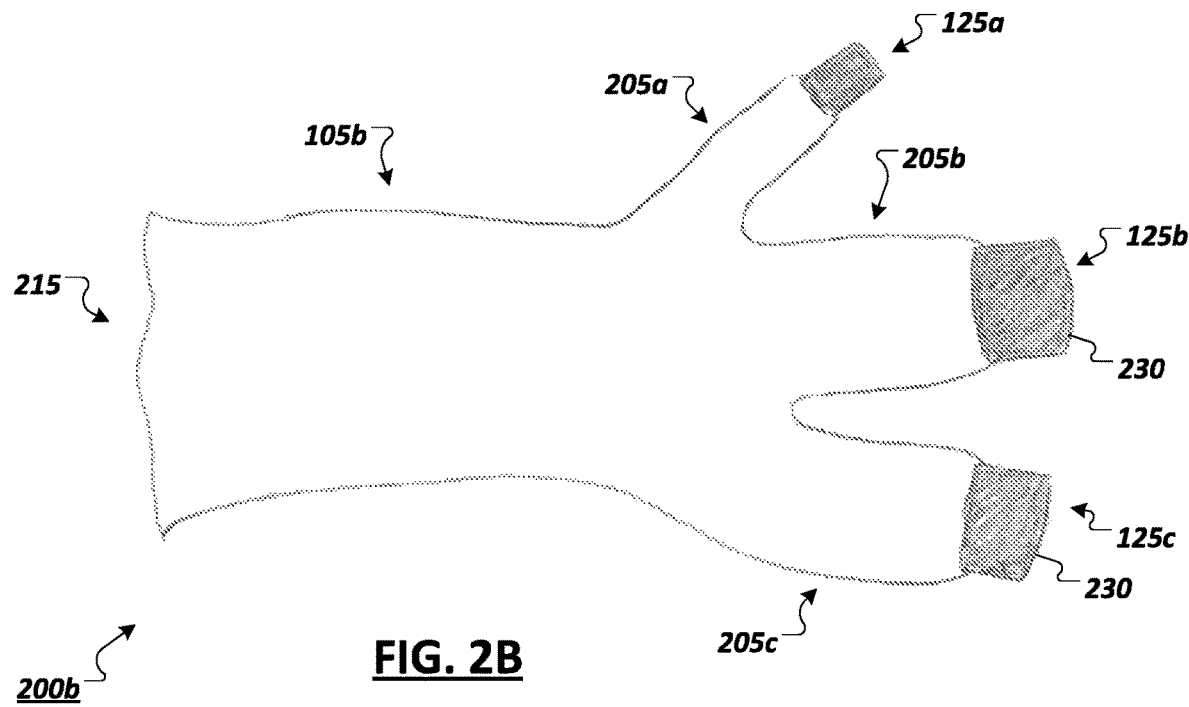

The diagrams 200*a-f* of FIGS. 2A-2F illustrate various alternative implementations of a scraper glove that includes at least one scraper element. For instance, as shown in the example of FIG. 2A, a scraper glove 105*a* according to a five-fingered implementation is provided, which includes five finger sleeves. In this example, each of the five finger sleeves may be provided with a corresponding scraper element (e.g., 120*a-e*), as in the example shown in FIGS. 1A-1B. Although each finger sleeve is shown with a corresponding scraper element, in some alternative examples, scraper elements may be omitted from one or more of the finger sleeves (e.g., omitted from the thumb or pinkie finger sleeves), among other examples. Turning to FIG. 2B, some implementations of a scraper glove (e.g., 105*b*) may provide for fewer than five finger sleeves. For instance, three finger sleeves (e.g., 205*a-c*) may be provided, each with a respective scraper element (e.g., 125a-c). In this example, the sleeves may be configured such that a first sleeve (e.g., 205a) is to accept the thumb of the user, a second sleeve (e.g., 205b) is to accept the pointer and middle fingers, and a third finger sleeve is to accept the ring and pinkie fingers. Other implementations may include finger sleeves configured for other combinations of fingers, such as a first sleeve for the thumb, a second for the pointer finger, and the third for the remaining fingers of the hand, or a first sleeve for the thumb, a second sleeve for the pointer, middle, and ring fingers, and the third sleeve for the pinkie finger, among other example implementations. Further shown in the example of FIG. 2B is an alternative glove opening 215, which may be included in some implementations of a scraper glove. While some implementation may include a glove opening (e.g., 220) that may be tightened or self-tighten (e.g., using a tie or elastic band) around the arm (e.g., upper or forearm) of the user, such a feature may be omitted in some implementations in favor of a simplified traditional glove opening, among other example features and embodiments. Further, scraper gloves can be implemented in various lengths. For instance, the sleeve of the glove may extend to the wrist, forearm, or the upper arm (e.g., above the elbow of the user), among other example lengths and implementations.

Figure 2C:
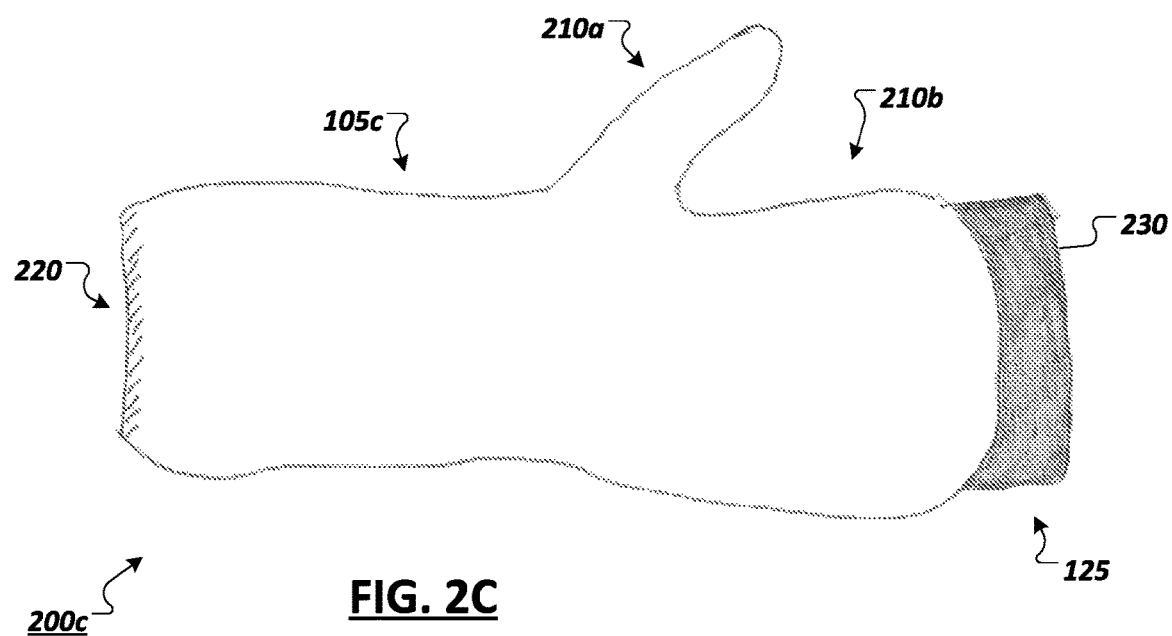
Figure 2D:
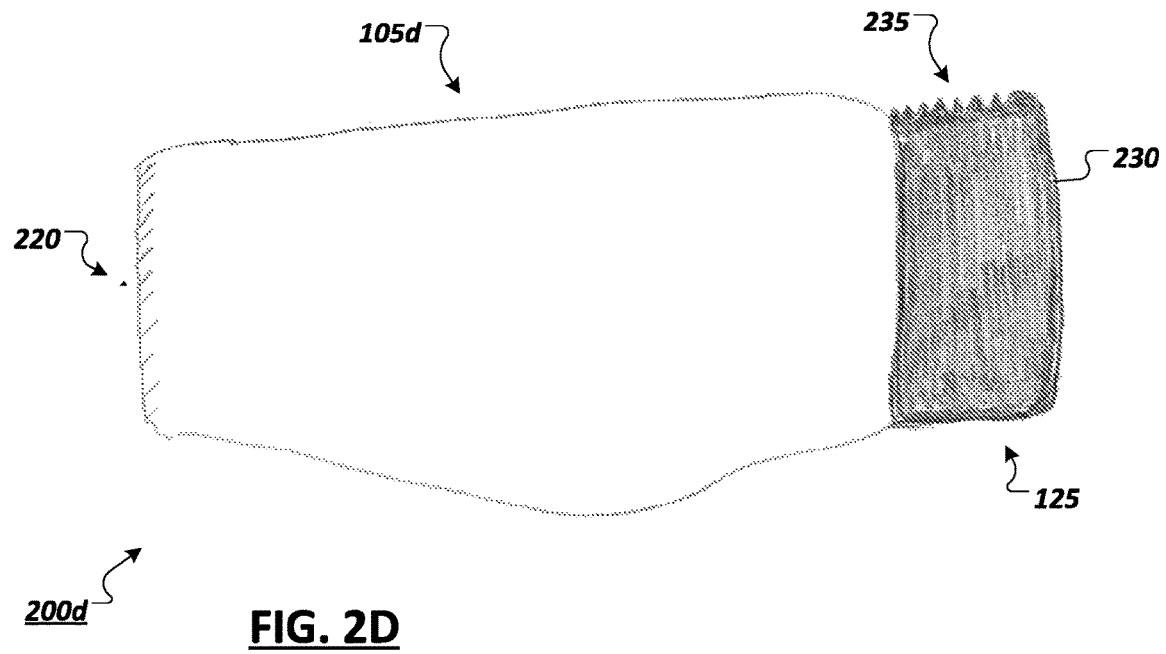

FIG. 2C shows yet another example of a scraper glove 105c, this implementation having two finger sleeves. For instance, a first finger sleeve 210a may be configured to house the thumb of the user, with the wider, second sleeve 210b configured to house the remaining fingers of the user. In some instances, such a configuration can allow for a larger scraping element 125 to be provided (on the end of the second sleeve 210b). Further illustrated in the example of FIG. 2C is the concept that implementations of a scraper glove (e.g., 105c) may omit scraper elements from at least some of the finger sleeves (e.g., 210a). FIG. 2D shows another example where a larger, unified scraper element 125 may be provided, similar to the example of FIG. 2C. In this example, the glove may allow several fingers to apply force and manipulate the scraper element 125. For instance, all fingers of the user, with the exception of the thumb, may principally control the scraper element 125, among other example implementations.

Figure 2E:
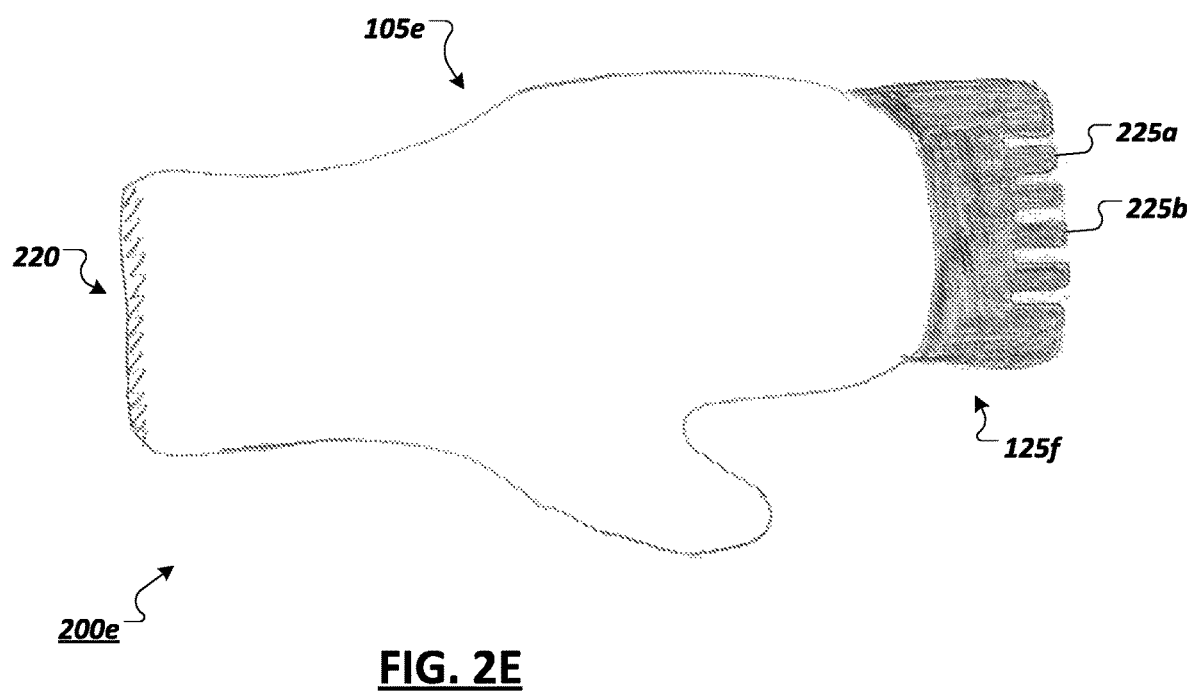

FIG. 2E is another example of a scraper glove 105e, which may include and support a large scraper element (e.g., 125f). While scraper elements in some implementations (e.g., as in the examples of FIGS. 2A-2D) may have a substantially flattened edge that is to come in contact with the plant-based medium and scrape surfaces of the medium, other implementations may provide for curved, jagged, or other geometries. For instance, in FIG. 2E, a pronged scraper element 125f is provided with one or more prongs (e.g., 225a,b), which may be used to enhance the scraper and collection of pulp from at least some varieties of plant-based media, among other examples and enhancement. For instance, one or more surfaces of a scraper glove may be textured, such as the scraper elements, exterior surfaces of the finger sleeves, exterior surfaces of the glove corresponding to the palm, knuckles, or other parts of the hand to enhance the grip of the glove, encourage the collection and gathering of slippery pulp materials, provide additional functionality in the glove (e.g., to smooth a surface of the medium using a roughened surface of the glove), among other example features. In some instances, such as in the example of FIG. 2D, the scraper element may be provided with a principle, or top, scraping edge (e.g., 230), as well as other edges (e.g., 235), which may also be used to scrape the medium or perform other work on the medium. As an example, a side edge 235 of the scraper element 125 shown in FIG. 2D may be serrated to allow the side of the scraper element 125 of the glove 105d to cut or saw the plant-based medium, among other example features.

Figure 3A:
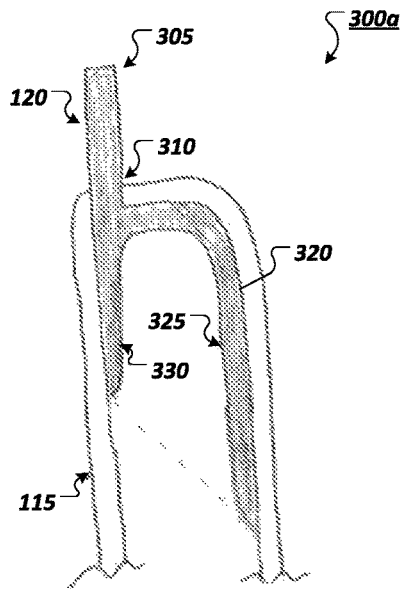
FIGS. 3A-3E are cross-sectional views of example finger sleeves and scraper elements of example scraper gloves.
Figure 3B:
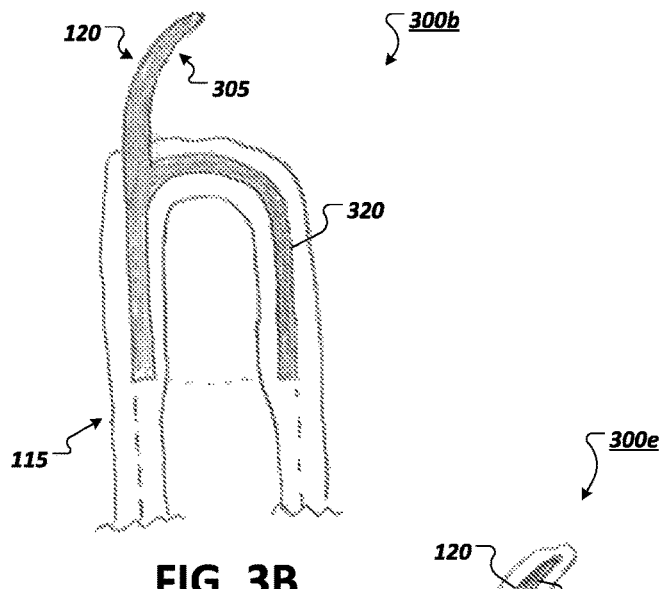

Turning to the diagrams 300a-d of FIGS. 3A-3D, cross-sectional views are shown of example finger sleeves 115 with embedded scraper elements 120. For instance, in FIG. 3A, a scraper element 120 is shown with a scraper portion 305a that is oriented as a substantially straight scraper extending from the tip of the finger sleeve. An opening 310 may be formed in the material of the finger sleeve, through which the scraper portion 305a of the scraper element 120 may extend. In some implementations, the scraper element 120 may additionally include a receptacle portion 320 into which at least the distal phalanx of the user's finger may be inserted to apply force to and control movement of the scraper element 120. In some instances, the receptacle portion 320 may be of a length to accept the entire finger of some users. As shown in the example of FIG. 3A (and the example of FIG. 3C, in some cases, the receptacle portion 320 may have an oblong opening to accommodate a receptacle shape which is longer on the side (e.g., 325) that is to come in contact with the palmar side of the user's finger, and shorter on the side (e.g., 330) of the scraper receptacle 320 that is to be proximate to the dorsal side of the finger when worn by the user. In such examples, providing additional receptacle length proximate to the palmar side of the user's finger(s) may allow additional leverage to be applied to the scraper element to enhance its utility. In other cases, such as shown in the example of FIG. 3B, the receptacle portion 320 may be uniform in length (e.g., with a substantially circular opening through which the user's finger(s) is to be received), among other example implementations.

Continuing with the example of FIG. 3B, scraper elements (e.g., 120) may not only differ in size and span (e.g., as illustrated in the examples of FIGS. 2A-2E), but different scraper glove embodiments may offer scraper elements with different shapes. For instance, as shown in the cross-sectional view 300b of the example scraper element of FIG. 3B, the tip or foremost edge 340 of the scraper element may be tapered or sharpened to enhance its scraping or carving functionality. The scraper element 120 in some instances, may be at least slightly curved (e.g., as in FIG. 3B) to promote scraping of some plant-based media, among other examples.

Figure 3E:
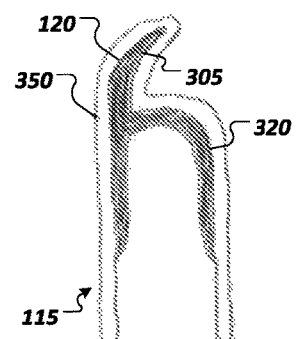

A scraper element may be attached to the finger sleeve of the glove during manufacture of the scraper glove. For instance, in the example of FIG. 3A, the scraper element may be passed through an opening 310 in the tip of the finger sleeve, with an adhesive being applied to the permanently bond and seal the scraper element to the glove. Heat bonding may be used in some implementations to connect scraper elements to the glove. In another example, the finger sleeves may be formed around the scraper element. For instance, the glove and finger sleeves may be manufactured using a liquid rubber material (e.g., latex, rubber) and constructed by depositing the liquid rubber on a mold, which may include the scraper elements. Accordingly, a scraper element may be dipped with a mold to cause the glove body to be formed over the exterior and/or interior surface(s) of the scraper elements. A combination of molding, heat bonding, and gluing may be performed to connect scraper elements to a glove body. In some cases, as shown in FIG. 3E, the glove material (e.g., 350) may be formed over and enclose the scraper element(s) (e.g., 120), among other example implementations and manufacturing techniques. For instance, as shown in FIG. 3B, the interior of the rigid scraper element receptacle may be coated and enclosed in the elastomeric material used for the glove. In some implementations, the base of the glove body may be dipped to deposit the liquid rubber material on the mold. Thereafter, scraper elements may be placed or adhered to the finger tips on the mold. In some instances, the mold, with the scraper elements, may be re-dipped to fasten the scraper elements to the glove body and facilitate a water tight seal. In some instances, where the mold is "double dipped" in the liquid rubber material to strengthen the attachment of the scraper elements to the glove, to limit the thickness and material use, only a portion of the mold may be dipped in the first dip to form only a portion of the overall glove body (e.g., the fingers or finger tips whereon the scraper elements will be deposited), with the entire mold be re-dipped once the scraper elements are attached, among other example manufacturing techniques and processes.

Figure 3C:
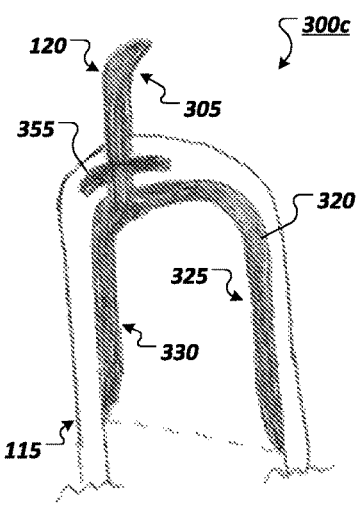
Figure 3D:
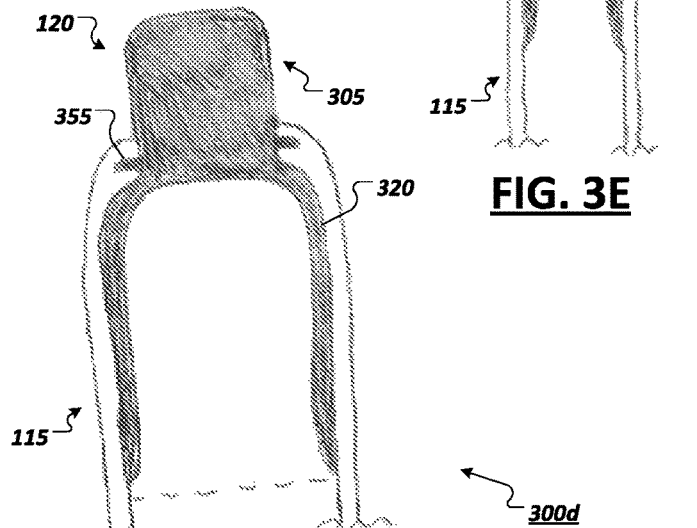

In some instances, the glove finger sleeves may be formed to interlock with the scraper elements to attach the scraper elements to the finger sleeves. For instance, as shown in the example of FIGS. 3C-3D, the scraper element 120 may be provided with a lip 355 (e.g., on the scraper portion and/or receptacle portion) which is designed to mate with a recess (e.g., 360) formed in the material of the finger sleeve. FIG. 3C shows a side cross-sectional view of such an implementation, with FIG. 3D showing a corresponding front cross-sectional view. Alternatively, the material of the finger sleeve may be provided with a lip, and the scraper element 120 may have the corresponding recess to accept the lip. In such instances, construction of the scraper glove may include inserting scraper element pieces up through the finger sleeve to cause at least a portion of the scraper portion (e.g., 320) to pass through an opening in the finger sleeve and cause the lip 355 to interlock with the recess. In some instances, the attachment of the scraper element to the finger sleeve may be enhanced by adhering the scraper element to the finger sleeve. In other instances, the glove may be formed around the scraper element, with the lip 355 serving to structurally reinforce the scraper element's attachment to the finger sleeve, among other example implementations.

Figure 4A:
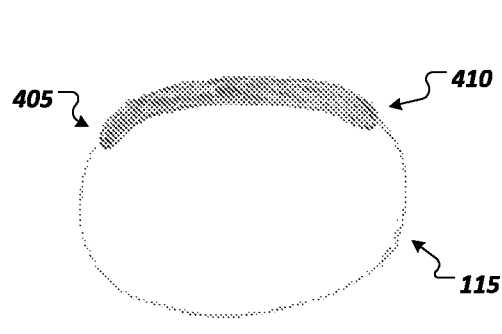
FIGS. 4A-4B are top views of example scraper elements connected to finger sleeves of example scraper gloves.
Figure 4B:
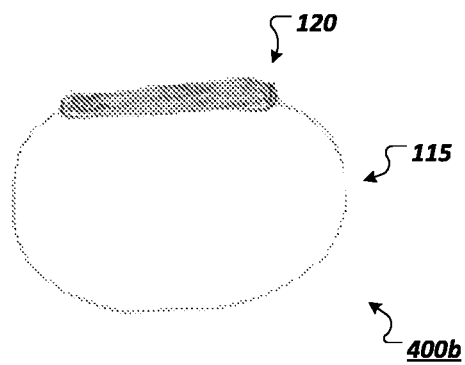

Turning to the examples of FIGS. 4A-4B, top views 400a-b are shown of example scraper elements attached to finger sleeves of example scraper gloves. The top view, in this context, refers to the view of the top of the finger sleeve (i.e., with the fingertips of the finger sleeves pointing toward the viewer). For the top view, the geometry of some example scraper elements can be observed, specifically the shape of the top scraping edge (e.g., 230) of the scraper element. For instance, in FIG. 4A, an example scraper element 120a is presented which curves at the ends (e.g., 405, 410) of the scraping edge. This can assist, in some implementations, in gathering pulp scraped from the plant-based medium. Alternatively, as shown in FIG. 4B, the scraping edge may be substantially straight or linear in dimension, among other scraping edge profiles (e.g., as shown in the examples of FIGS. 5A-6D).

Figure 5D:
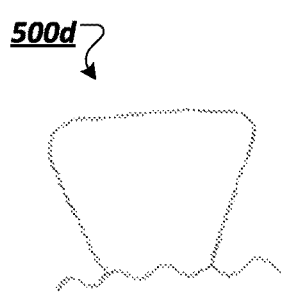
FIGS. 5A-5F are front views of scraping portions of example scraper elements for inclusion in example scraper gloves.
Figure 5E:
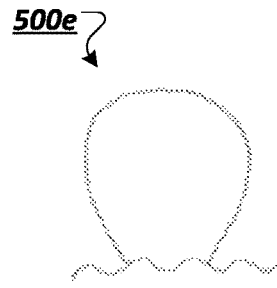
Figure 5F:
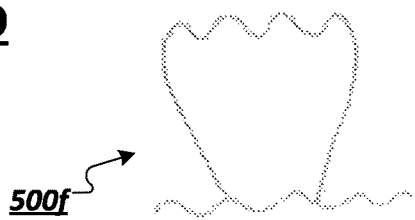
Figure 5A:
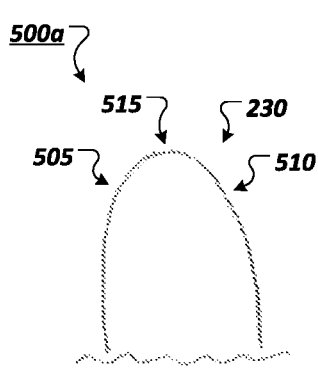
Figure 5B:
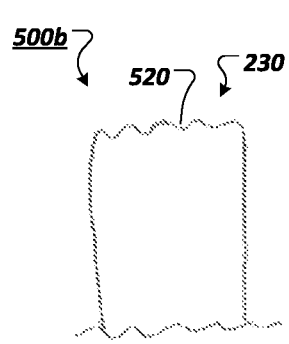

Turning to FIGS. 5A-5F, front views 500a-f of example scraper elements of a scraper glove are shown. FIGS. 5A-5F show other views of the geometry that may adopted in some scraper element designs. For instance, in FIG. 5A, a spade-like scraping edge 230 is shown, with the ends 505, 510 tapered down from the tip 515 of the scraping edge. FIG. 5B shows another example scraping edge design, in this instance, with a scalloped or serrated edge 520 (e.g., to enhance the scraping functionality of the scraping edge). In yet another example, shown in FIG. 5C, a substantially straight or linear scraper profile is shown, among other examples. Indeed, it should be appreciated that the various features described herein may be combined and sub-combined to implement a variety of different embodiments without departing from the more general principles and solutions descried herein. As an example, a scraper element may have a geometry that is linear when viewed from the top (e.g., such as in FIG. 4B), is tapered or spade-like when viewed from the front (or back) (e.g., as in FIG. 5A), and curved when viewed from the side (e.g., as in FIG. 3A), among other example configurations.

Figure 2F:
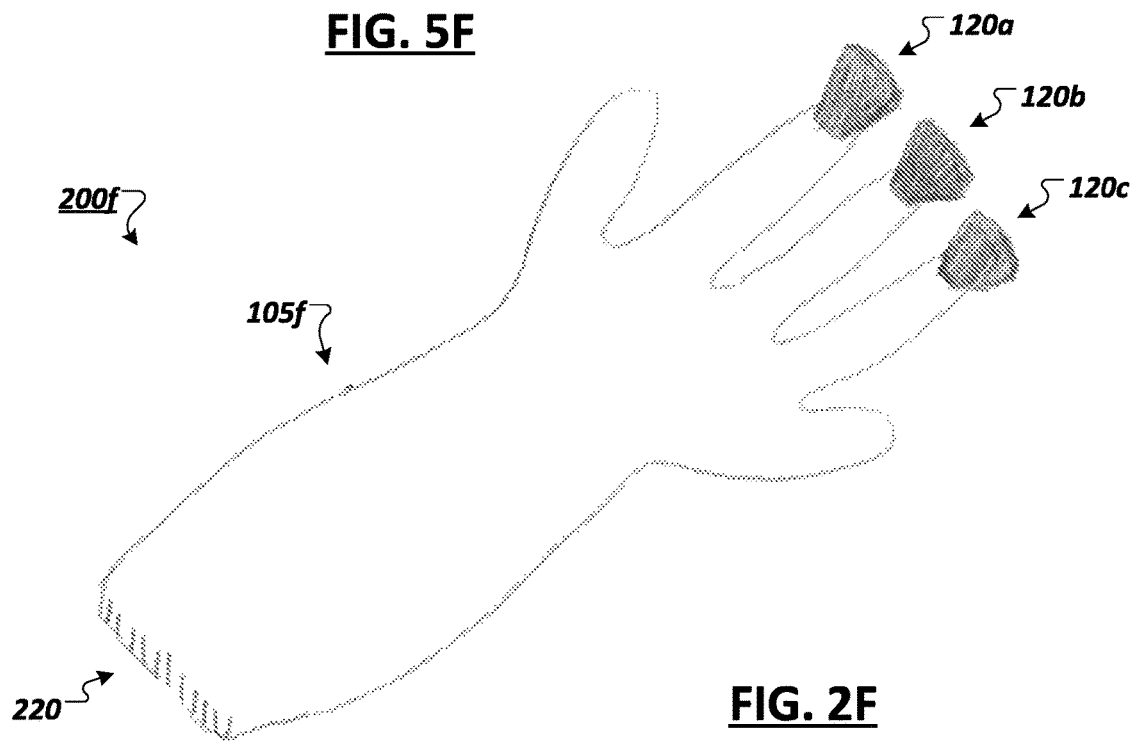
Figure 5C:
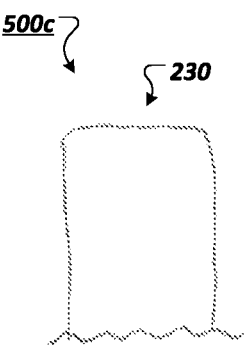

While the examples of FIGS. 5A-5C show scraper elements with substantially even geometries where the base of the scraper element (e.g., the portion of the scraper element lowest on the finger) is approximately the same width as the scraping edge of the scraper element, in other instances, the geometries of one or more scraper elements may be uneven in that the width of the base of the scraper element is substantially larger or smaller than the width of the scraping edge. For instance, FIGS. 5D-5F show example scraper elements with uneven, flared geometries, such that the scraping edges of the scraper elements are wider than their respective bases. Flared scraper elements, such as those illustrated in the examples of FIGS. 5D-5F, may facilitate a wider scooping or scraping platform and enable more efficient scraping through use of the scraper glove in some instances. FIG. 2F shows an example scraper glove 105f that incorporates flared scraper elements 120a-c. The example of FIG. 2F also shows that, in some instances, the number of scraper elements attached to the glove may be fewer than the number of finger sleeves incorporated in the glove.

Figure 6B:
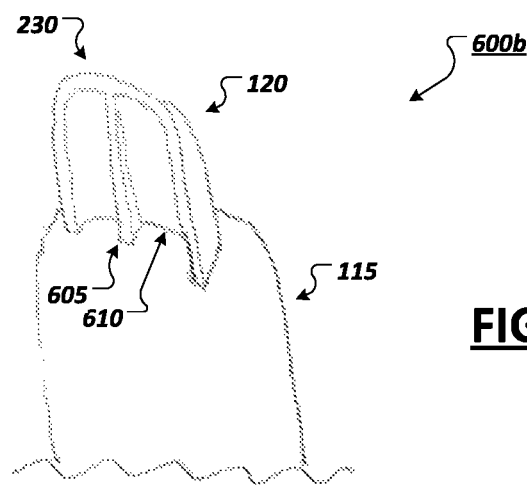
FIGS. 6A-6D are perspective views of example scraper elements connected to finger sleeves of example scraper gloves.
Figure 6D:
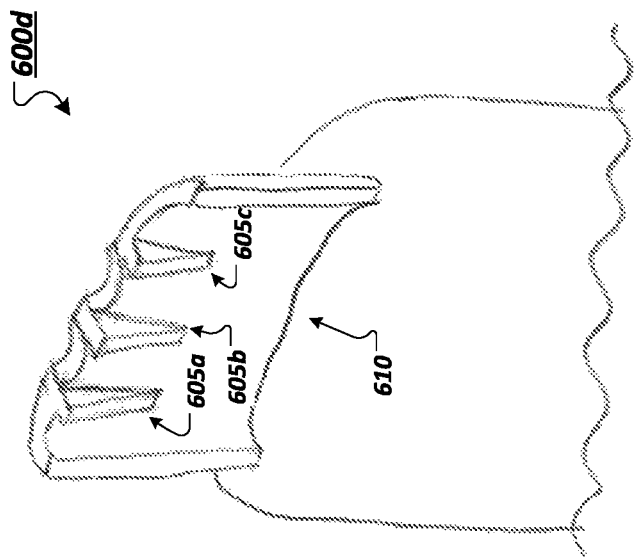
Figure 6C:
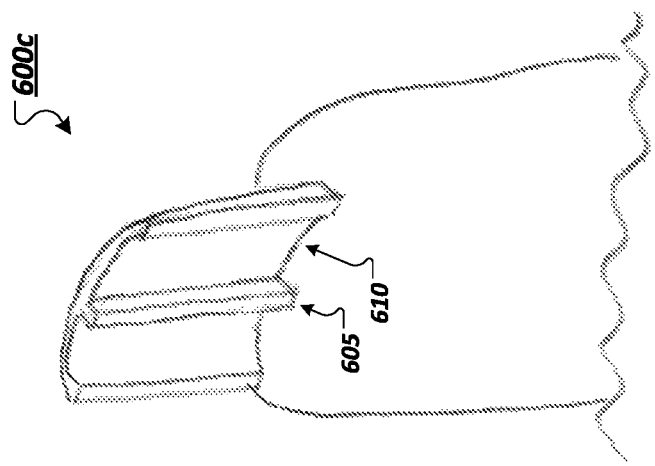
Figure 6A:
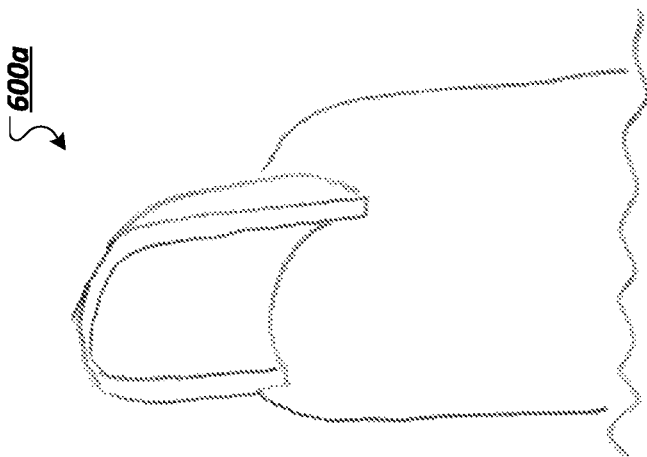

FIGS. 6A-6D illustrate perspective views of example scraper elements, which may be attached to an example finger sleeve 115 of a scraper glove. For instance, FIG. 6A illustrates a first example implementation of a scraper element 120. FIG. 6B illustrates another example scraper element, similar to the design in FIG. 6A, but with a rib member 605 running from the base 610 of the finger sleeve tip (i.e., the base 610 corresponding to the point at which the scraper element emerges from or joins the tip of the finger sleeve) and tapering until it meets flush with the scraping edge 230 of the remaining scraping portion of the scraper element. The rib member 605 may provide additional structural support and stability to the scraper element during scraping and may even enhance scraping and collection of pulp, as the rib protrudes from the front surface of the scraping portion and may provide a raking function during scraping. Additionally, as shown in the example of FIG. 6C, protrusion of an example rib member 605 may include protrusion from or near the scraping edge of the scraper element to enhance scraping and raking functionality provided through the scraper element. Still further, as shown in the example of FIG. 6D, multiple ribs may be provided on a single scraper element. In some cases, a serrated or scalloped scraping edge design may be combined with and correspond to multiple ribs provided on the scraping element, as shown in the example of FIG. 6E. Indeed, as noted above, features discussed above and illustrated in the figures of this disclosure may be combined in a variety of different embodiments. For instance, in the example of FIG. 6B, the scraper element may have a curved base 610 (with a cross-section resembling the curved scraper element of FIG. 4A), which tapers up to form a substantially linear scraping edge 230 and includes a rib 605 that similarly tapers from the base 610 to the top scraping edge 230. Indeed, As shown in the example of FIGS. 6D-6E, in implementations including one or more rib elements in the scraping portion of a scraper element, ribs may be implemented with a variety of different geometries. For instance, in FIG. 6D, the rib 605 runs the entire span from the base 610 to the scraping edge 230 of the scraper element, protruding substantially uniformly throughout the span of the rib. In other implementations, the rib may protrude at the top scraping edge, but taper down to protrude less or not at all at other points between the scraping edge 230 and the base 610. Indeed, in some cases, a mix of different ribs may be provided in scraper elements of the same scraper glove or even on the same scraper element (where multiple ribs are provided), among other example implementations. Accordingly, it should be appreciated that while some of scraper glove features are illustrated and described herein in an isolated and focused manor, this is only for convenience in describing each of these features. Scraper gloves, as presented herein, may incorporate potentially any combination of the features discussed herein, including gloves with scraper elements of uniform or non-uniform design, among other example features and sub-features.

Figure 7A:
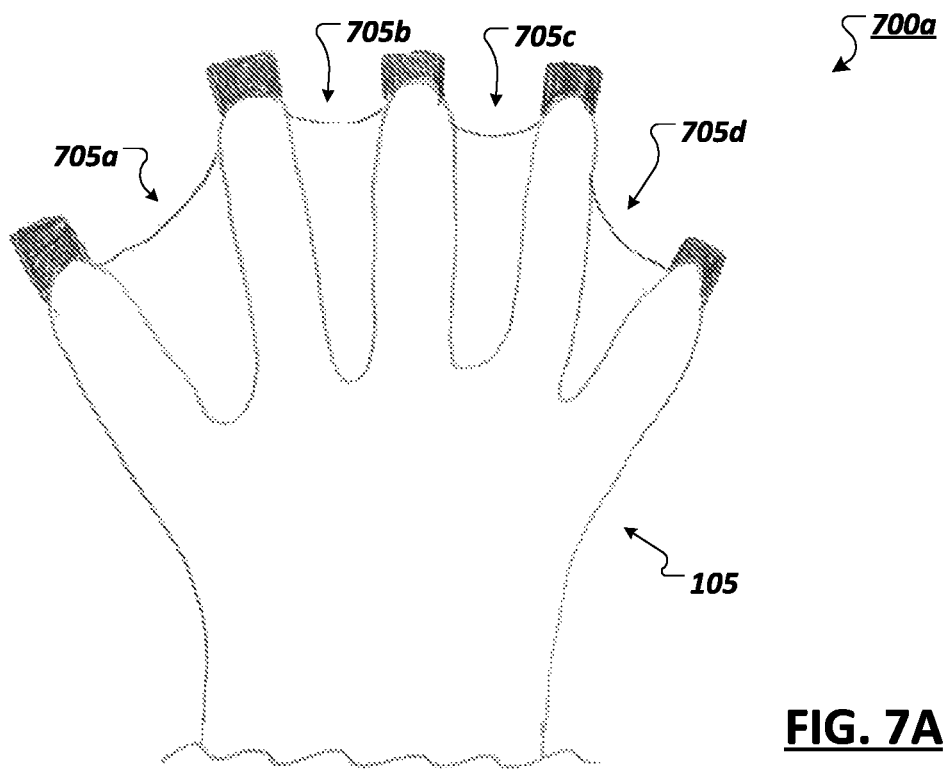
FIGS. 7A-7C are diagrams of example scraper gloves including webbing sections.
Figure 7B:
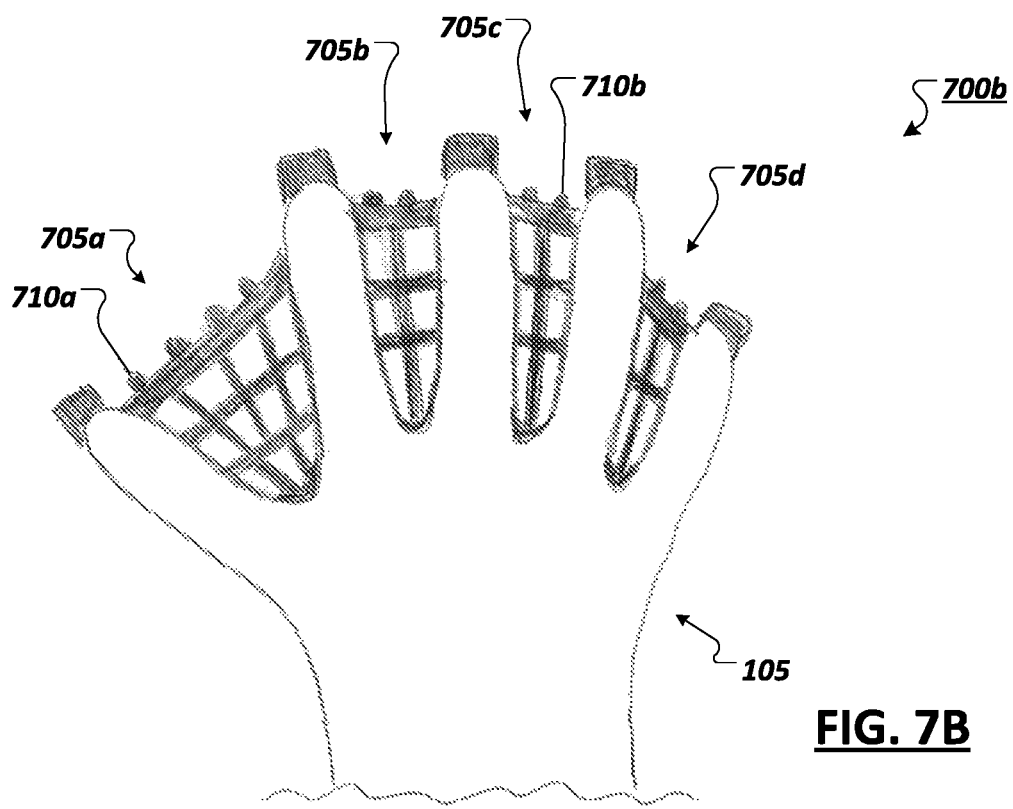
Figure 7C:
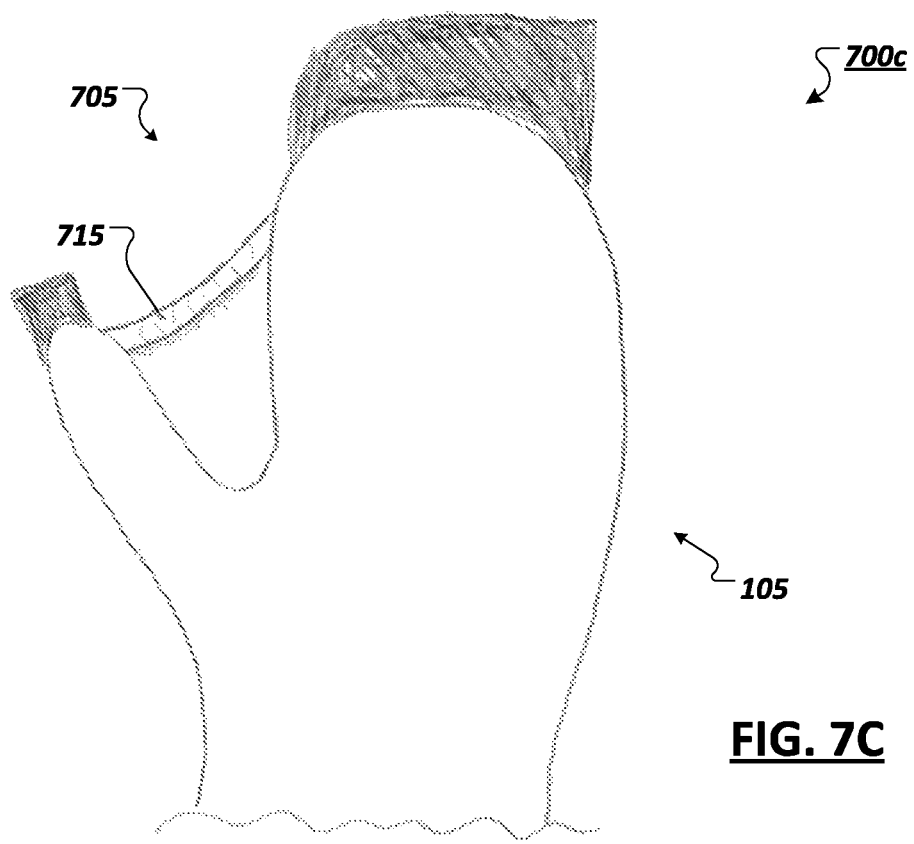

Turning to the diagrams 700a-c of FIGS. 7A-7C, in some implementations, a scraper glove may include webbing between one or more pairs of finger sleeves. FIG. 7A is a diagram 700a showing an implementation of a five-fingered implementation, with webbing (e.g., 705a-d) between and connecting each of the adjacent finger sleeves. The webbing may assist in trapping pulp scraped from a plant-based medium using the scraper glove 105. In some cases, the webbing may be formed integrally from the same material as the finger sleeves of the glove. In other instances, another material (more or less rigid or elastic than the glove material) may be utilized for the webbing. As shown in the example of FIG. 7B, in some implementations, the webbing (e.g., 705a-d) may be implemented to form a mesh- or net-like webbing to capture larger pulp solids but allow some liquids to escape (e.g., through the openings in the webbing). As further shown in the example of FIG. 7B, protrusions (e.g., 710a-b) may be provided on the top of some of the webbing sections to allow the webbing sections to assist in scraping of the medium. In other instances, protrusions may be added to the front surface of the webbing sections. For instance, as shown in the example of FIG. 7C, a lip 715 may be provided along the top of webbing 705 to assist in trapping pulp scraped by the scraping members and collected in the webbing of an example scraper glove. As further shown in the example of FIG. 7C, webbing may be provided in scraper glove implementations including fewer than five finger sleeves. Further, webbing elements may only be provided between some neighboring pairs of the finger sleeves, while be omitted from others, among other example implementations.

In some implementations, scraper gloves may incorporate aesthetic enhancements, including imaging and molding added to the body of the glove and finger sleeves, as well as the scraper element to allow the scraper gloves to resemble popular costume gloves. For instance, a scraper glove may be enhanced to resemble the hand of a skeleton, zombie, werewolf, or other Halloween theme or character. Indeed, while scraping elements may be implemented primarily for their utility in scraping a plant-based medium, such as the inside of a pumpkin (e.g., in preparation for jack-'o-lantern carving, the coloring and shape of the scraper elements may be enhanced according to a them (e.g., with individual scraper elements shaped and colored to resemble fingernails of a monster). The number of finger sleeves may also be adapted in some designs to accommodate certain novelty designs. For instance, a three-fingered sleeve design may be utilized to implement a scraper glove designed to resemble the hand of a mutant reptile character, among other fun and engaging aesthetic enhancements, which would not otherwise detract from the utility of the scraper elements or the larger scraper glove itself.

Figure 8:
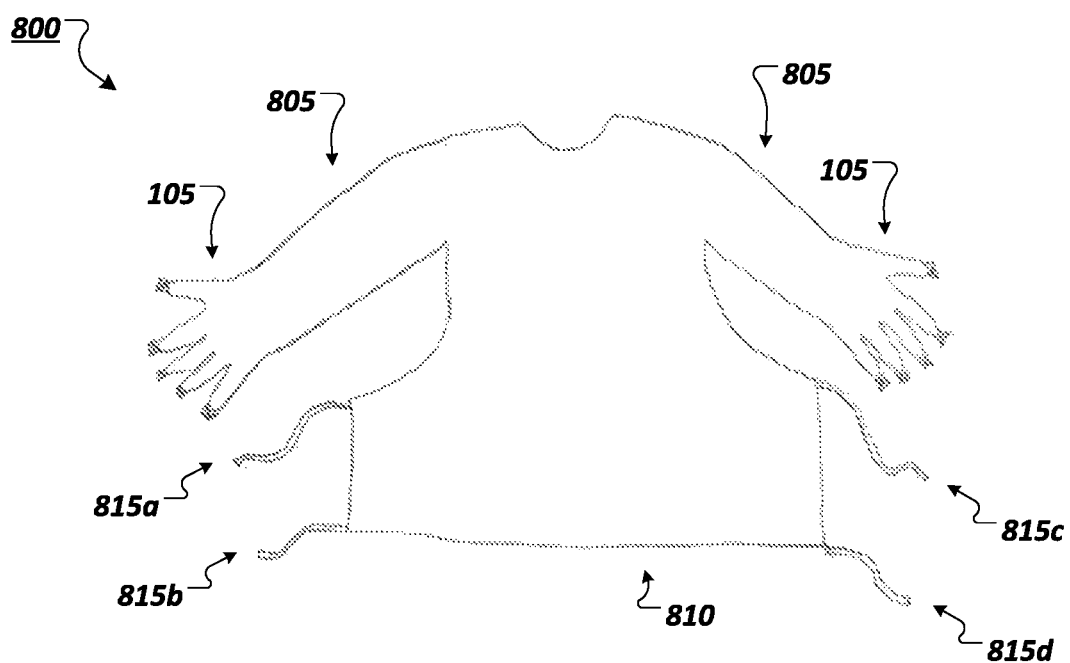
FIG. 8 is a simplified diagram illustrating example scraper gloves connected to an apron in accordance with at least one embodiment.

Additionally, in some implementations, such as shown in the diagram 800 of FIG. 8, scraper gloves may be connected to an apron, which may serve the dual purpose of offering further protection from pulp and juices contacting or staining clothing, but also to enhance themed scraper glove designs. For instance, the scraper glove 105 may be augmented to resemble a witch's hand, with the sleeve 805 and apron 810 portions printed or otherwise styled to resemble the witch's arms and clothing. Indeed, a variety of themes and designs may be adopted to further enhance the fun and attraction of using the scraper glove 105 in connection with holiday or other crafts, among other example features. Implementations integrating scraper gloves with an apron may include ties (e.g., 815a-d) or other attachment mechanisms (e.g., snaps, Velcro, buttons, zippers, etc.) to wrap the apron around the torso of the user and secure the apron to the user, among other example features.

Accordingly, several example embodiments have been described in the present Specification. Additional combinations and sub-combinations may also be realized without diverging from the subject matter of the present disclosure. For instance, Example 1 is an article including: a scraper glove including: a glove body including one or more finger sleeves; and one or more scraper elements, where each of the scraper elements includes: a receptacle portion positioned within a respective one of the finger sleeves to accept one or more fingers of a user; and a scraping portion including one or more scraping edges extending from a tip of the corresponding finger sleeve and integrally connected to the corresponding receptacle portion, where the scraping portion is configured to scrape a plant-based medium.

Example 2 includes the subject matter of Example 1, where the glove body includes a glove body made of an elastomeric material.

Example 3 includes the subject matter of Example 2, where the elastomeric material includes at least one of nitrile, latex, silicon, or rubber.

Example 4 includes the subject matter of any one of Examples 2-3, where the scraping element is made of a material more rigid than the elastomeric material.

Example 5 includes the subject matter of Example 4, where the material of the scraping element includes a rigid plastic.

Example 6 includes the subject matter of any one of Examples 1-5, where the one or more finger sleeves consists of one finger sleeve.

Example 7 includes the subject matter of any one of Examples 1-5, where the one or more finger sleeves consist of two finger sleeves.

Example 8 includes the subject matter of any one of Examples 1-5, where the one or more finger sleeves consist of three finger sleeves.

Example 9 includes the subject matter of any one of Examples 1-5, where the one or more finger sleeves consist of four finger sleeves.

Example 10 includes the subject matter of any one of Examples 1-5, where the one or more finger sleeves consist of five finger sleeves.

Example 11 includes the subject matter of any one of Examples 1-10, where each of the one or more finger sleeves is coupled to a respective scraping element.

Example 12 includes the subject matter of any one of Examples 1-11, where the one or more fingers sleeves includes a plurality of finger sleeves.

Example 13 includes the subject matter of any one of Examples 1-12, where the scraping elements are connected to less than all of the plurality of finger sleeves.

Example 14 includes the subject matter of Example 13, further including a webbing section between at least one pair of adjacent finger sleeves in the plurality of finger sleeves.

Example 15 includes the subject matter of Example 14, where a respective webbing section joins each pair of adjacent finger sleeves in the plurality of finger sleeves.

Example 16 includes the subject matter of any one of Examples 14-15, where the webbing includes a lip formed along a top edge of the webbing.

Example 17 includes the subject matter of any one of Examples 14-16, where the webbing includes one or more openings.

Example 18 includes the subject matter of Example 17, where the webbing includes a mesh-like webbing.

Example 19 includes the subject matter of any one of Examples 14-18, where the webbing section is formed integrally with and of the same material as the pair of adjacent finger sleeves.

Example 20 includes the subject matter of any one of Examples 14-18, where the webbing section is formed of a material different from the materials of the pair of adjacent finger sleeves Example 21 includes the subject matter of Example 20, where the webbing section is formed of the same material as a scraper element connected to at least one of the pair of adjacent finger sleeves Example 22 includes the subject matter of Example 21, where the webbing section is integrally connected to the scraper element connected to at least one of the pair of adjacent finger sleeves.

Example 23 includes the subject matter of any one of Examples 1-22, where at least a particular one of the one or more scraper elements includes a rib.

Example 24 includes the subject matter of Example 23, where the particular scraper element includes a plurality of ribs.

Example 25 includes the subject matter of any one of Examples 23-24, where at least one of the ribs protrudes from a surface of the particular scraper element near a top scraping edge of the particular scraper element.

Example 26 includes the subject matter of any one of Examples 23-25, where at least one of the ribs extends from the tip of the particular finger sleeve to the scraping edge of the particular scraper element.

Example 27 includes the subject matter of any one of Examples 1-26, where at least one of the scraper elements includes a protrusion and is to connect to a corresponding one of the finger sleeves by positioning the protrusion within a recess formed in the finger sleeve.

Example 28 includes the subject matter of any one of Examples 1-26, where at least one of the scraper elements includes a recess and is to connect to a corresponding one of the finger sleeves by positioning a protrusion formed in the finger sleeve within the recess formed in the scraper element.

Example 29 includes the subject matter of any one of Examples 1-28, where a top scraping edge of at least one of the scraper elements is linear.

Example 30 includes the subject matter of any one of Examples 1-29, where a top scraping edge of at least one of the scraper elements is curved.

Example 31 includes the subject matter of any one of Examples 1-30, where at least one of the scraper elements curves from the tip of the corresponding finger sleeve to a top scraping edge of the scraper element.

Example 32 includes the subject matter of any one of Examples 1-31, where at least one of the scraper elements extends linearly from the from the tip of the corresponding finger sleeve to a top scraping edge of the scraper element.

Example 33 includes the subject matter of any one of Examples 1-32, where at least one scraping edge of at least one of the scraper element is scalloped or serrated.

Example 34 includes the subject matter of Example 33, where the at least one scraping edge includes a top scraping edge of the scraper element.

Example 35 includes the subject matter of Example 33, where the at least one scraping edge includes a side scraping edge of the scraper element.

Example 36 includes the subject matter of any one of Examples 1-35, where the scraper glove includes an opening configured to tighten around an arm of the user.

Example 37 includes the subject matter of any one of Examples 1-36, further including an apron coupled to the scraper glove.

Example 38 includes the subject matter of any one of Examples 1-37, wherein at least one of the scraper elements is a flared scraper element.

Example 39 is a method to manufacture the article of any one of Examples 1-38.

Example 40 is a method to use the article of any one of Examples 1-38.

Example 41 is a method including: attaching a scraper element to a finger sleeves of a glove, where the scraper element includes: a receptacle portion positioned within a respective one of the finger sleeves to accept one or more fingers of a user; and a scraping portion including one or more scraping edges extending from a tip of the corresponding finger sleeve and integrally connected to the corresponding receptacle portion, where the scraping portion is configured to scrape a plant-based medium.

Example 42 includes the subject matter of Example 41, where attaching the scraper element to the finger sleeve includes adhering the scraper element to an interior surface of the finger sleeve.

Example 43 includes the subject matter of Example 41, where attaching the scraper element to the finger sleeve includes forming the finger sleeve over the scraper element.

Example 44 includes the subject matter of Example 41, where attaching the scraper element to the finger sleeve includes forming the finger sleeve within an interior surface of the receptacle.

Example 45 includes the subject matter of Example 44, where attaching the scraper element to the finger sleeve further includes forming the finger sleeve over an exterior surface of the receptacle.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. An article comprising:
   a scraper glove comprising:
      a glove body comprising one or more finger sleeves and a thumb sleeve; and
      one or more scraper elements, wherein each of the scraper elements comprises:
         a receptacle portion positioned in association with a particular one of the finger sleeves, wherein the receptacle portion and the particular finger sleeve have respective widths adapted to accept a plurality of fingers of a user; and
         a scraping portion comprising one or more scraper elements extending from a tip of the corresponding finger sleeve and integrally connected to the corresponding receptacle portion, wherein an edge of the scraper element comprises a continuous arc spanning the entire width of the receptacle portion, and the edge of the scraper element is serrated to configure the scraping portion to scrape a plant-based medium,
   wherein the thumb sleeve lacks a scraper element.

2. The article of claim 1, wherein the glove body comprises a glove body made of an elastomeric material.

3. The article of claim 2, wherein the elastomeric material comprises at least one of nitrile, latex, silicon, or rubber.

4. The article of claim 2, wherein the scraping element is made of a material more rigid than the elastomeric material.

5. The article of claim 1, wherein the one or more finger sleeves consists of one finger sleeve.

6. The article of claim 1, wherein the one or more finger sleeves consist of two finger sleeves.

7. The article of claim 1, wherein the one or more finger sleeves consist of three finger sleeves.

8. The article of claim 1, wherein the one or more finger sleeves consist of five finger sleeves.

9. The article of claim 1, wherein each of the one or more finger sleeves is coupled to a respective scraping element.

10. The article of claim 1, wherein the scraping elements are connected to less than all of the plurality of finger sleeves.

11. The article of claim 1, further comprising a webbing section between at least one pair of adjacent finger sleeves in the plurality of finger sleeves.

12. The article of claim 1, wherein at least a particular one of the one or more scraper elements comprises a rib.

13. The article of claim 1, wherein a top scraping edge of at least one of the scraper elements is linear.

14. The article of claim 1, wherein a top scraping edge of at least one of the scraper elements is curved.

15. The article of claim 1, wherein at least one of the scraper elements comprises a flared scraper element.

16. The article of claim 1, wherein at least one of the scraper elements curves from the tip of the corresponding finger sleeve to a top scraping edge of the scraper element.

17. The article of claim 1, wherein at least one of the scraper elements extends linearly, in alignment with a direction of a fingertip disposed within a corresponding finger sleeve, from the tip of the corresponding finger sleeve to a top scraping edge of the scraper element.

18. The article of claim 1, wherein the scraper glove comprises an opening configured to tighten around an arm of the user.

19. The article of claim 1, further comprising an apron coupled to the scraper glove.

20. The article of claim 1, wherein the plant-based medium comprises an interior of a pumpkin.

* * * * *